July 19, 1955 N. W. PARKER 2,713,649

VOLTAGE CONTROL CIRCUIT

Filed April 8, 1952

INVENTOR.
Norman W. Parker
BY
Foorman L. Mueller
Atty.

United States Patent Office 2,713,649

Patented July 19, 1955

2,713,649

VOLTAGE CONTROL CIRCUIT

Norman W. Parker, Park Forest, Ill., assignor to Motorola, Inc., Chicago, Ill., a corporation of Illinois Application April 8, 1952, Serial No. 281,177

6 Claims. (Cl. 315—13)

Figure 1:
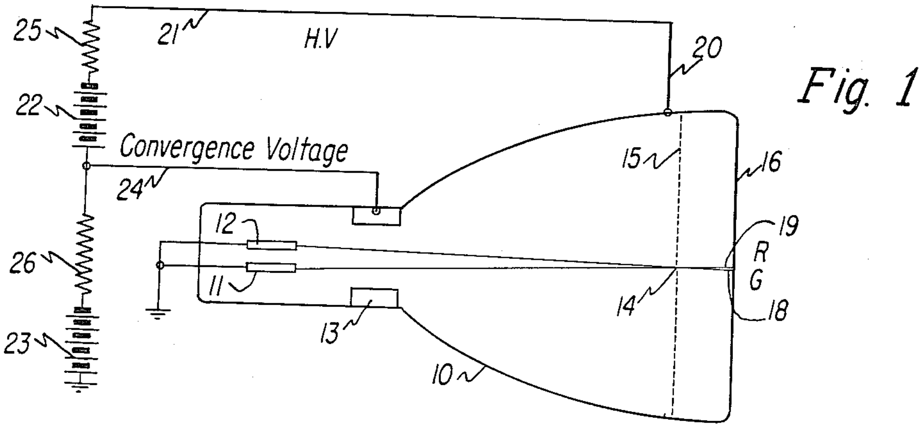

The present invention relates to television receivers and more particularly to an improved high voltage power supply for energizing a color television picture tube of the type having a plurality of electron beams that are to be converged within the tube.

One generally known form of color television picture tube employs a plurality of separate electron beams which are individually modulated with information of a respective primary color. The separate electron beams are passed through an electrostatic lens structure known as a convergence electrode whereby the beams are caused to converge at a common point, such as in an aperture of a mask that is positioned in a plane parallel to and spaced from the fluorescent screen of the tube. The converged electron beams passing through the mask aperture are then in correct registry to impinge on respective different color phosphor dots arranged in symmetrical groups on the fluorescent screen of the tube face. If for some reason the electron beams are not properly converged at the mask aperture, the beams will not be correctly registered with the respective color phosphor dot and incorrect color rendition results.

The convergence electrode is designed to be energized by the application thereto of a positive polarity high potential direct current which is of a predetermined lower static potential than the potential of the accelerating voltage applied to the tube anode. A dynamically varying converging potential may also be applied to the convergence electrode to obtain the correct beam convergence points as the beams are deflected to scan the fluorescent screen, but this invention is concerned only with the manner of obtaining the static convergence voltage.

It is apparent that variations in anode potential or static convergence potential in a manner to change their predetermined voltage relationship will result in color misregistration. To further complicate the situation, it has been found that the inherent characteristics of the picture tube structure are such that if the anode voltage is lowered, the required convergence electrode voltage must be lowered by a greater percent to maintain the correct beam convergence point. Therefore the predetermined relationship is not the same for varying anode voltage potentials. It has been previously proposed to employ voltage regulated power supplies for the anode and convergence electrode voltage sources to hold these voltages constant and thereby avoid the above difficulties. This solution, however, is not entirely satisfactory because such regulated high voltage power supplies are quite complex and usually cannot be adapted for use with a conventional horizontal sweep flyback pulse type of high voltage energy source.

It is an object of the present invention to provide an improved and simplified high voltage power supply for obtaining both the anode voltage and the static convergence voltage to be applied to a color television picture tube of multibeam type.

Another object of the invention is to provide a high voltage power supply to be energized from the flyback pulse of a television receiver horizontal sweep circuit and to obtain both the static convergence voltage and the higher anode voltage therefrom for energizing a multi-beam color television picture tube.

Still another object of the invention is to provide a high voltage power supply for obtaining a first high potential direct current and a second high potential direct current of a predetermined lower value than the first potential, in a circuit arrangement such that variations of the first potential are accompanied by even greater variations of the second potential so that a non-linear relationship suitable to maintain the proper convergence of the electron beams of a multi-beam color picture tube is obtained when said first and second potentials are used as anode and convergence potentials, respectively.

A feature of the invention is the use of two high voltage power supply portions, one power supply portion having poor regulation of its output voltage and connected to energize the convergence electrode of a multi-beam color television picture tube, and the other power supply portion having comparatively good regulation of its output voltage, with the output voltages of both power supply portions being connected in series to the anode of the picture tube whereby the desired relationship between anode and convergence voltage may be obtained over an operating range of voltages which may vary due to variations of power supply energy.

Another feature of the invention as particularly used with television receiver circuits of the type having a horizontal sweep flyback transformer to supply energy for the picture tube high voltage, is the provision of a voltage multiplier rectifying circuit connected to the transformer, the output circuit of the first or lower potential rectifying stages of the multiplier circuit including an adjustable impedance to provide adjustable poor voltage regulation thereof with respect to the voltage regulation of the total output voltage of the multiplier circuit, so that the voltage of the first or lower voltage stage provides the proper voltage for the convergence electrode and the total output voltage provides the proper voltage for the anode of a color television picture tube.

Figures 2, 3:
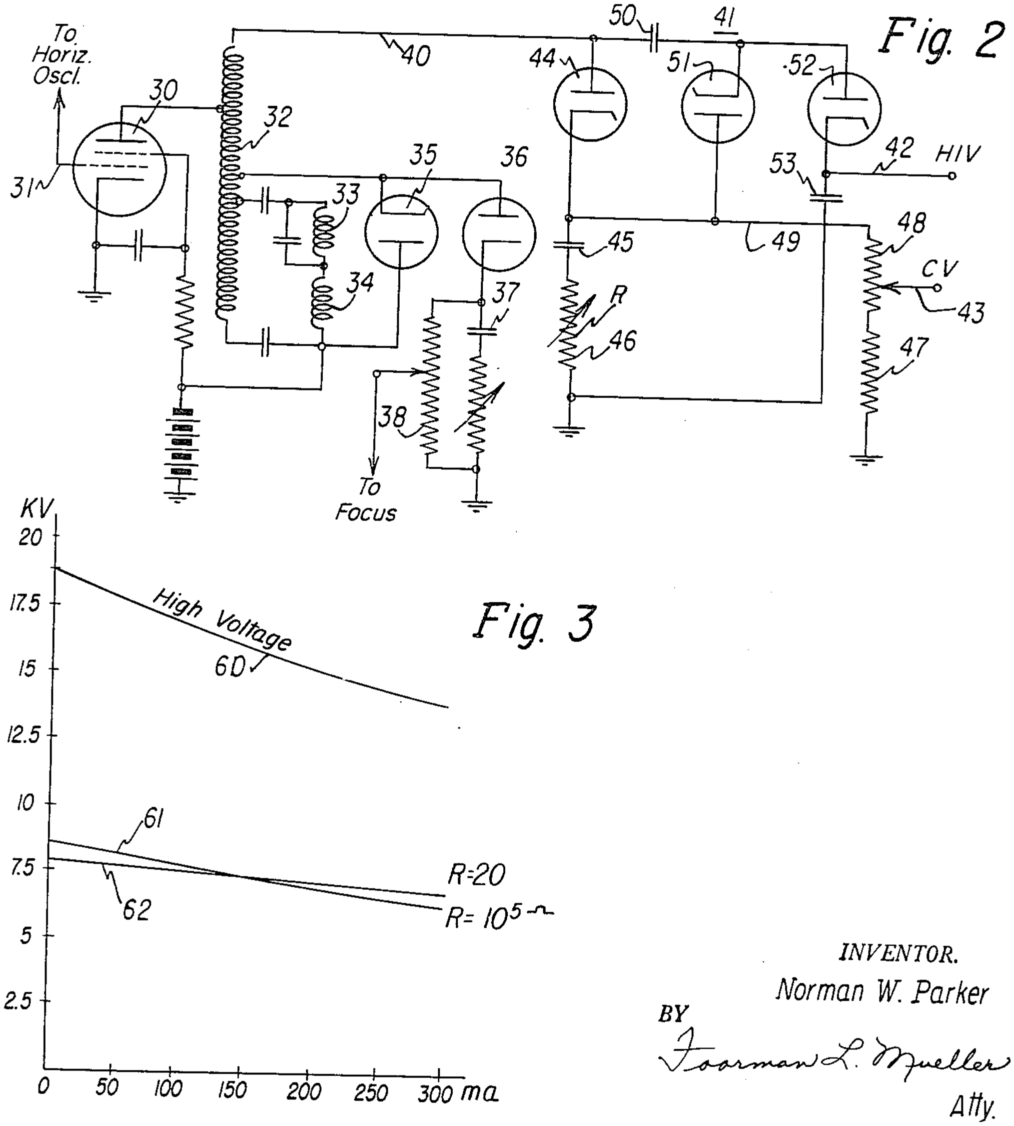

Further objects, features and the attending advantages of the invention will be apparent with reference to the following specification and drawings in which:

Fig. 1 is a simplified schematic of the circuit of the invention showing its use with a multi-beam color television picture tube, Fig. 2 is a schematic diagram of a practical embodiment of the invention, and Fig. 3 is a family of curves to show the operation of the invention.

In practicing the invention, a high voltage power supply is provided for a multi-beam color television receiver tube including, a first rectifying device for rectifying the high voltage pulses from the horizontal flyback transformer as generally used in television receiver circuits. A first storage condenser and an adjustable impedance are connected as a first output circuit in series with the output of the first rectifying device. The voltage across the first output circuit is applied to the convergence electrode of the multi-beam picture tube. The voltage across the first output circuit is also connected to charge a second storage condenser that is connected in series with the high voltage pulses of the transformer and a second rectifying device in a voltage multiplying circuit. The output of the second rectifying device is connected to a third storage condenser in a second output circuit which provides the high voltage for the anode of the picture tube. By adjusting the value of the impedance in the first output circuit, a desired non-linear relationship of rate of change in voltage of the first output circuit for corresponding changes in the higher voltage of the second output circuit is obtained to thereby preserve the correct beam convergence of the multi-beam color television picture tube during voltage changes resulting from variations of supply energy.

For a more detailed description of the invention, reference is made to the drawing wherein Fig. 1 shows diagrammatically in simplified form a multi-beam color television picture tube 10. The picture tube 10 may be provided with a plurality of electron guns such as shown at 11 and 12. The electron beam from the gun 11 may be modulated with information corresponding to the amount of red primary color in the picture to be reproduced while the electron beam from gun 12 may be similarly modulated with information corresponding to green color content of the picture to be reproduced. It should be understood that additional electron guns for other primary color information may also be used, but for the sake of clarity only two guns are shown in the drawings. The electron beams from the guns 11 and 12 are passed through an electrostatic lens structure 13 known as a convergence electrode which causes the beams to be converged at the point 14 which may correspond to an aperture in a mask 15. The mask 15 has a large number of apertures over the entire scanning area and is placed in a plane parallel to and spaced from the fluorescent face 16 of the television picture tube. The converged electron beams passing through the aperture 14 are thereby registered to impinge upon respective green and red phosphor dots 18 and 19 which are symmetrically placed behind each of the apertures of the mask. It should be understood that the tube 10 is a known form of commercially available color television picture tube and the structure of the tube as such forms no part of the present invention.

The high voltage anode 20 of the picture tube 10 is connected by the line 21 to be energized by the voltage across the power supply portions 22 and 23 connected in series. The lower potential high voltage for energizing the convergence electrode 13 is connected by the line 24 from the potential appearing across the power supply portion 23 only. The voltage in line 24 may be termed a static convergence voltage and has a predetermined value in relation to the tube anode voltage in line 21 such that the electron beams will be converged at the central aperture 14 when the beams are in their central non-deflected position. As the electron beams are deflected to scan the picture tube the convergence voltage in line 24 must also be dynamically varied in order to preserve the convergence points in the flat plane of the apertured mask 15. The present invention is not concerned with the manner of obtaining the dynamically varying convergence voltage, and it will be understood that such may be obtained in any suitable manner not shown.

The inherent voltage regulation of the power supply portions 22 and 23 is in part determined by their internal impedances which are diagrammatically shown on Fig. 1 by the resistances 25 and 26. If the internal impedances 25 and 26 of power supplies 22 and 23 are the same, the voltage regulation of such power supply portions will be the same. In operating the tube 10, the current drawn in line 24 is so little as to be practically zero, while the current drawn in line 21 depends upon the beam current of the picture tube and is comparatively much higher than the current in line 24. It has been found that a known reduction of potential in line 21 for energizing the anode 20 of the picture tube requires an even greater reduction of the potential in line 24 as applied to the convergence electrode 13, if the electron beams are to be correctly converged at the point 14 of the mask 15. In other words, the rate of change for the potentials in lines 21 and 24 will not be directly proportional if the correct beam convergence is provided. According to the invention, the desired predetermined relationship between the potentials in lines 21 and 24 may be obtained over a varying range of operating voltages by changing the value of the internal impedance 26 of the power supply portion 23 with respect to the internal impedance 25 of the power supply portion 22. Thus in such manner the voltage regulation of power supply 23 may be adjusted to be not as good as the voltage regulation of the power supply 22, so that a change to lower the potential in line 21 will be accompanied by a correspondingly greater rate of change lowering the potential in line 24.

The power supply arrangement of the invention as shown and described in connection with the simplified circuit of Fig. 1 may be embodied in the practical circuit shown in Fig. 2 of the drawings. The horizontal sweep voltage output tube 30 is provided with a control grid connected by line 31 to the horizontal oscillator circuit of a television receiver, not shown. The plate of the output tube 30 is connected to the horizontal output transformer 32. The horizontal deflection coils 33 and 34 for the magnetically deflected color television picture tube 10 are connected as shown, and a damper rectifier tube 35 is also provided, as is customary. In order to obtain a comparatively low voltage direct current potential for focussing the picture tube, the rectifier tube 36 is connected to furnish direct current across the storage condenser 37 and the focus potentiometer 38 by rectifying a portion of the flyback pulse energy in the transformer 32.

The maximum high voltage flyback pulse energy in the transformer 32 is connected by line 40 to a voltage multiplying rectifying circuit generally shown at 41. The voltage multiplying circuit provides two direct current output voltages, a high voltage across line 42 and ground for connection to the high voltage anode 20 of the picture tube 10 (Fig. 1) and a lower voltage across the line 43 and ground for application to the convergence electrode 13 of the color picture tube. The voltage multiplier circuit 41 includes a first rectifying device or tube 44 having a storage condenser 45 and adjustable impedance 46 connected between its cathode electrode and chassis ground as a first output circuit. A very high resistance 47 and a potentiometer 48 are connected in series with chassis ground and line 49 to the voltage appearing across the output circuit including the condenser 45 and adjustable impedance 46. The adjustable tap of the potentiometer 48 is connected to line 43 and to the convergence electrode of the color television picture tube 10.

A second storage condenser 50 is connected to be charged through the diode 51 by the voltage appearing across the first output circuit including condenser 45 and adjustable impedance 46. The second storage condenser 50 is also connected in series with the flyback pulse energy in line 40 in a voltage multiplying circuit to the rectifying device 52. The output circuit of the rectifying device 52 includes the storage condenser 53 and the multiplied high voltage thereacross is connected by line 42 to the high voltage anode 20 of the color television picture tube 10.

The adjustable impedance device 46 in series with the condenser 45 in the first output circuit of the first rectifying device 44 has the effect of making the voltage regulation in such output circuit comparatively poor with respect to the voltage regulation in the output circuit of the second rectifying device 52 which does not include any such series impedance device. Therefore, changes in potential of the flyback pulse of the transformer 32 as applied by line 40 to the voltage multiplier circuit 41 will cause non-linear changes in the predetermined voltage relationships of the voltages in lines 42 and 43. In other words, if the changing voltage of the flyback pulse in line 40 is such as to lower the high voltage output in line 42, the voltage in line 43 will also be lower, but the changes in voltage will not be proportional due to the impedance 46 which causes the voltage in line 43 to be lowered at a correspondingly greater rate than the voltage in line 42. By adjusting the value of the impedance 46 a desired non-linear relationship between the rate of change of voltage in line 42 and the rate of change of voltage in line 43 may be obtained so that the application of such voltages to the anode and convergence electrodes respectively of the color television picture tube 10 will maintain the desired convergence of the electron beams over a wide range of varying supply voltages.

The curves of Fig. 3 of the drawing show the results obtained with the circuit of the invention wherein the current is plotted on the abscissa and the voltage is plotted on the ordinate. Curve 60 represents the value of the high voltage in line 42 and curve 61 represents the convergence voltage value in line 49 with respect to ground when the value of the resistance 46 is about 1 megohm. Curve 62 shows the value of the convergence voltage in line 49 when the value of the resistance 46 is zero. The different voltage rate of change for the convergence voltage in line 49 with respect to the rate of change of the high voltage in line 42 is readily apparent.

Typical circuit values for the voltage multiplier components of Fig. 2 are as follows.

Condensers 45, 50 and 53=500 micromicrofarads
Resistor 46=1 megohm adjustable
Resistor 47=50 megohms
Resistor 48=15 megohm potentiometer
Tubes 44, 51 and 52=type 1 x 2 rectifiers It should be understood that the invention is not intended to be limited to the particular circuit of the practical embodiment shown in Fig. 2 of the drawings since other arrangements may be devised to provide the desired combination of two power supplies having good regulation and poor regulation respectively in a manner to obtain the desired relationship between high anode voltage and lower convergence electrode voltage. For example, the diode 51 may be replaced by a suitable resistance and other types of rectifying devices may be used in place of the tubes 44 and 52. Similarly, the particular type of horizontal output transformer as shown in 32 may be modified to change the manner of obtaining the flyback pulse energy for the high voltage power supply circuit.

It is also to be pointed out that the power supply is not limited to use with a predetermined color tube structure, but may be used with any tube requiring two high voltages having the relationship set forth.

Various modifications may be made within the spirit of the invention and the scope of the appended claims.

I claim:

1. A high voltage power supply for a television picture tube of the type having at least one electron beam to be converged within the tube, said picture tube having an anode to be energized by a first high potential direct current voltage of positive polarity for accelerating the electron beam, said picture tube also having a convergence electrode responsive to a second lower high potential direct current voltage of positive polarity for converging the electron beam, the characteristics of the tube being such that changes in value of one of the voltages referred to above require non-linear changes in the other of the voltages to preserve convergence of the beam, the power supply including in combination, a first source of direct current voltage including a rectifying device and series-connected capacitive means and impedance means connected in series with said rectifying device, with the direct current voltage from said first source appearing across said capacitive and impedance means, a second source of direct current voltage including a rectifying device with capacitive means connected in series therewith and across which capacitive means the direct current voltage from said second source appears, said second source thereby having relatively low internal impedance as compared with said first source, means for connecting said first source to the convergence electrode, means for connecting said second source to the anode, and means interconnecting said first source to said second source so that variations in the voltage of said second source produce a current flow through said capacitive and impedance means of said first source to produce potential changes in the voltage of said first source non-linearity related to variations in potential of the voltage of said second source.

2. A high voltage power supply for a color television picture tube having a plurality of electron beams to be converged within the tube, said picture tube having an anode to be energized by a first high potential direct current voltage of positive polarity for accelerating the electron beams, the picture tube also having a convergence electrode responsive to a second lower high potential direct current voltage of positive polarity for converging the electron beams at a desired point within the tube, the characteristics of the tube being such that changes in value of one of the voltages referred to above require non-linear changes in the other of the voltages to preserve convergence of the beams, the power supply including in combination, a first source of direct current voltage including a rectifying device, and capacitive means and resistive means series-connected between said rectifying device and a point of reference potential, with the direct-current voltage from said first source appearing across said capacitive and resistive means, a second source of direct current voltage including a rectifying device with capacitive means connected between said last-named rectifying device and said point of reference potential, with the direct current voltage from said second source appearing across said last-named capacitive means and said second source having a relatively low internal impedance as compared with said first source, means for connecting said first source to the convergence electrode, means for connecting said second source to the anode, and means interconnecting said first source to said second source so that variations in current from said second source produce a current flow through said capacitive and resistance means of said first source to produce potential changes in the voltage of said first source non-linearly related to variations in potential of the voltage from said second source due to variations in the current therefrom.

3. A circuit for converting a source of supply current of high voltage pulses into a first high potential direct current and a second high potential direct current lower than the first potential, with variations of supply current producing variations of first and second potentials in non-linear relation to each other such that said second high potential varies at a greater rate of change than said first high potential, a first rectifying device connected to said source of supply current pulses, a first storage condenser and an impedance connected in the output circuit of said first rectifying device, a second storage condenser connected in series with said first storage condenser, a second rectifying device, means connecting said second storage device in series with said source of supply current pulses and to said second rectifying device, and an output circuit including a third storage condenser connected to the output of said second rectifying device, said first high potential being derived across the output circuit of said second rectifying device and said second high potential being derived across the output circuit of said first rectifying device.

4. A circuit for converting a source of supply current of high voltage pulses into a first high potential direct current and a second high potential direct current lower than the first potential, with variations of supply current producing variations of first and second potentials in adjustable non-linear relation to each other such that said second high potential varies at an adjustable greater rate of change than said first high potential, a first rectifying device connected to said source of supply current pulses, a first storage condenser and an adjustable impedance connected in the output circuit of said first rectifying device, a second storage condenser connected in series with said first storage condenser, a second rectifying device, means connecting said second storage device in series with said source of supply current pulses and to said second rectifying device, and an output circuit including a third storage condenser connected to the output of said second rectifying device, said first high potential being derived across the output circuit of said second rectifying device and said second high potential being derived across the output circuit of said first rectifying device whereby an adjustment of the value of said impedance is effective to adjust the non-linear relation of the rate of change between said first and second high potentials.

5. In a color television receiver employing a color television picture tube of the type having a plurality of electron beams to be converged within the tube, said picture tube having an anode to be connected to a first high potential direct current voltage of positive polarity for accelerating the electron beam, the picture tube also having a convergence electrode responsive to a second lower high potential direct current static convergence voltage of positive polarity for converging the electron beams at a desired point within the tube, the characteristics of said tube being such that reductions in value of the first of said voltages require proportionately greater reductions in value of the second of said voltages to preserve the desired point of convergence of the electron beams, the high voltage power supply for deriving said first and second voltages from a source of high voltage pulses in the horizontal sweep circuit of the receiver including in combination, a first rectifying device connected to said source of high voltage pulses, a first storage condenser and an inpedance connected in the output circuit of said first rectifying device, a second storage condenser connected in series with said first storage condenser, a second rectifying device, means connecting said second storage device in series with said source of high voltage pulses and to said second rectifying device, and an output circuit including a third storage condenser connected to the output of said second rectifying device, said first voltage being derived across the output circuit of said second rectifying device and said second voltage being derived across the output circuit of said first rectifying device.

6. In a color television receiver employing a color television picture tube of the type having a plurality of electron beams to be converged within the tube, said picture tube having an anode to be connected to a first high potential direct current voltage of positive polarity for accelerating the electron beam, the picture tube also having a convergence electrode responsive to a second lower high potential direct current static convergence voltage of positive polarity for converging the electron beams at a desired point within the tube, the characteristics of said tube being such that reductions in value of the first of said voltages require an adjustably predetermined greater rate of reduction in value of the second of said voltages to preserve the desired point of convergence of the electron beams, the high voltage power supply for deriving said first and second voltages from a source of high voltage pulses in the horizontal sweep circuit of the receiver including in combination, a first rectifying device connected to said source of high voltage pulses, a first storage condenser and an adjustable impedance connected in the output circuit of said first rectifying device, a second storage condenser connected in series with said first storage condenser, a second rectifying device, means connecting said second storage device in series with said source of high voltage pulses and to said second rectifying device, and an output circuit including a third storage condenser connected to the output of said second rectifying device, said first voltage being derived across the output circuit of said second rectifying device and said second voltage being derived across the output circuit of said first rectifying device whereby an adjustment of the value of said impedance is effective to adjust the predetermined rate of reduction of the second voltage for corresponding reductions of the first voltage.

References Cited in the file of this patent

UNITED STATES PATENTS

| | | |
|---|---|---|
| 2,514,079 | Lockhart | July 4, 1950 |
| 2,555,147 | Meagher | May 29, 1951 |
| 2,579,705 | Schroeder | Dec. 25, 1951 |
| 2,588,652 | Nelson | Mar. 11, 1952 |
| 2,588,659 | Pond | Mar. 11, 1952 |
| 2,601,153 | Knight | June 17, 1952 |
| 2,621,305 | Little, Jr., et al | Dec. 9, 1952 |

FOREIGN PATENTS

| | | |
|---|---|---|
| 866,065 | France | Mar. 31, 1941 |